June 13, 1961 A. V. NICHOL 2,987,804

WIRING METHOD

Filed May 11, 1956 4 Sheets-Sheet 1

INVENTOR.
ARTHUR V. NICHOL
BY
Carl H. Sjunestvedt
AGENT

INVENTOR.
ARTHUR V. NICHOL
BY
Carl H. Synnestvedt
AGENT

June 13, 1961 A. V. NICHOL 2,987,804

WIRING METHOD

Filed May 11, 1956 4 Sheets-Sheet 3

INVENTOR.
ARTHUR V. NICHOL
BY
Carl H. Lynnestvedt
AGENT

WIRING METHOD

Filed May 11, 1956 4 Sheets-Sheet 4

INVENTOR.
ARTHUR V. NICHOL
BY
Carl H. Synnestvedt
AGENT

United States Patent Office 2,987,804

Patented June 13, 1961

2,987,804

WIRING METHOD

Arthur V. Nichol, Elkins Park, Pa., assignor to Philco Corporation, Philadelphia, Pa., a corporation of Pennsylvania Filed May 11, 1956, Ser. No. 584,234
1 Claim. (Cl. 29—155.55)

This invention has to do with the mechanized fabrication of wired chassis structures for radio receivers, television receivers and similar electronic and electrical devices. With greater particularity the invention relates to a new method of dressing and connecting the wires forming the interconnections between various terminals in such a chassis. The invention also provides new tool arrangements and new machine structure for these purposes.

To some extent, the interconnections of modern receivers and the like—interposed between circuit components such as tuned circuit coils, capacitors, tubes, transistors, resistors, transformers, switches, etc.—are provided by the well-known, so-called printed or etched circuits, that is, by conductors forming flat layers adherent to the surfaces of insulating panel boards. At the same time considerable use is also made of non-adherent, basically conventional, insulated wires, for interconnecting terminals of components and of circuit panels with one another or with chassis terminals or the like. The combined use of adherent and non-adherent conductors enhances efficiency as well as economy, it being possible by means of this expedient to build up a chassis from sets of relatively small, standardized printed circuit panels, each incorporating a subassembly of components. Servicing as well as manufacture is simplified by this construction and servicing is further facilitated by using suitable color coding in the insulations of the interconnecting conventional wires. In addition the use of conventional, insulated wires facilitates cross-overs of conductors, installation of circuitry in different planes, and effective use of three-dimensional space for circuitry. These advantages of using non-adherent wires are important in many cases, including notably many of those where large numbers of circuit components must be installed and interconnected in closely packed arrangements, in the interest of space saving.

Mechanical installation of the conventional wiring is desirable as it tends to be more rapid and also more accurate than the tedious manual work of preparing and connecting the various conductors. Therefore attempts have been made to develop mechanical methods and devices for the preparing or so-called dressing and for the connecting of conventional wires in chassis fabrication; and activity along these lines has been stimulated mainly by the gradual development of wire connecting methods, for instance by the advent of the so-called pressure wrapping method. However, the mechanical devices heretofore available for such purposes were subject to serious limitations. They were incapable, or not readily capable, of providing a chassis with color coded wires or with wires of different characteristics such as gauge or size; nor were they able to install the wires in the most favorably chosen forms or positions on a crowded chassis. In addition, said earlier wiring machines were rather slow.

It is a primary object of the present invention to overcome the limitations of the prior wiring methods, both manual and mechanical. Thus it is a particular object to provide a rapid and accurate method of and means for connecting conductors to terminals of chassis structures. Another particular object is to provide such a method and means which can be used to install conductors of different characteristics in a chassis. Further particular objects are to make it possible that the terminals to be connected can be spaced and located in any desired way, and that suitable wires, installed on or between terminals, can be formed in any desired shape, such as a straight line or a simple or complex curve or combinations of such shapes. Still other objects are: to facilitate interchange of wiring patterns as well as interchange of wire colors and of other wire characteristics, and to make the process, and the means for performing it, efficient and economical in other respects.

These objects have been achieved by novel arrangements and constructions of wiring tools and elements, a preferred form of which will be explained hereinafter. Briefly described for purposes of general orientation, the new apparatus as illustrated utilizes a conveyor, for instance an elongated belt, for transferring the chassis to be wired to wiring stations lined up along this conveyor, which stations serve to install different non-adherent conductors in the chassis. The stations are individually adapted, first to move predetermined lengths of insulated wires into individually predetermined wire positions, in planes parallel with fabricating positions of the chassis to be wired. The wire positions can be quite different from simple straight lines between terminals, thereby aiding substantially in avoiding mechanical as well as electronic difficulties. In said wire positions, the ends of the wires are registered with the fabricating positions of different terminals of the chassis brought to the different stations and each station has means for attaching at least one end of a wire, held in a wire position as described, to a terminal registered with said end. These means for shaping or dressing the wires and for attaching their ends are further combined with certain wire feeding means in each station and with other accessories.

All of this will be explained in greater detail in the description of a relatively simple embodiment, which follows. The embodiment is relatively simple in that it provides for the wiring of all non-adherent conductors of a chassis substantially in a single plane. As will be understood, various modifications can be produced, in accordance with the present invention, either with greater or with lesser complexity.

In the drawing,

FIGURE 8 is a view generally similar to FIGURE 7 but showing the tools after the wire-connecting operation, proper, whereas FIGURE 7 shows them before that operation.

FIGURE 9 is a sectional bottom view, taken along line 9—9 in FIGURE 8, and

Figure 10:
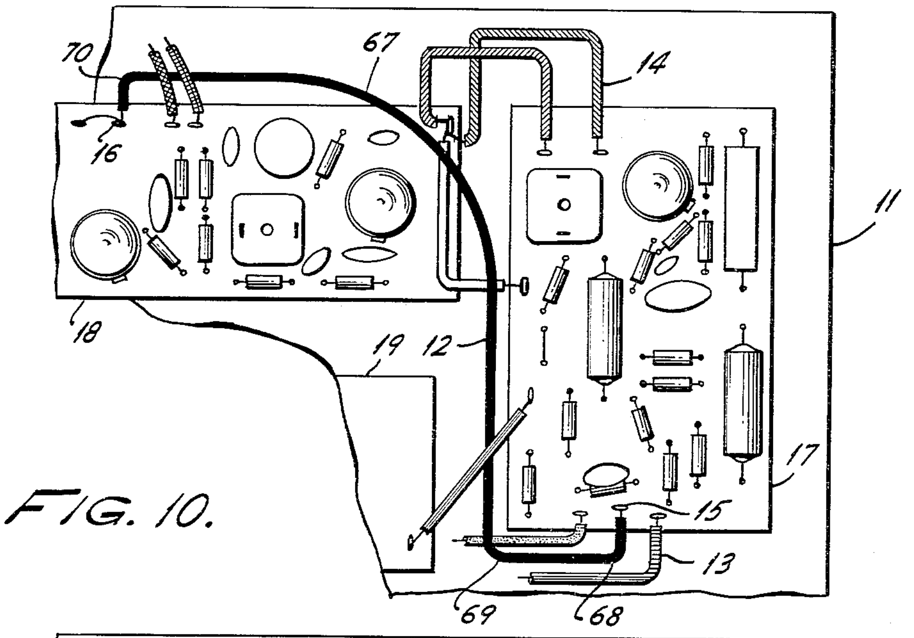
FIGURE 10 is a fragmentary view of a chassis which has been wired by a method and device corresponding with the present invention.

Reference may first be made to the chassis 11 shown in FIGURE 10. A chassis as shown cannot readily be fabricated by mechanized wiring machines available in the past. It can be made manually; but it is made more rapidly and also more dependably by the method and means according to the present invention. The improvement relates mainly to the dressing and attachment of the interconnecting wires 12, 13, 14, etc. between terminals 15, 16, etc., which are shown as conventional, insulated wires installed on different printed wiring panels 17, 18, 19 of the chassis 11.

Figures 1, 2:
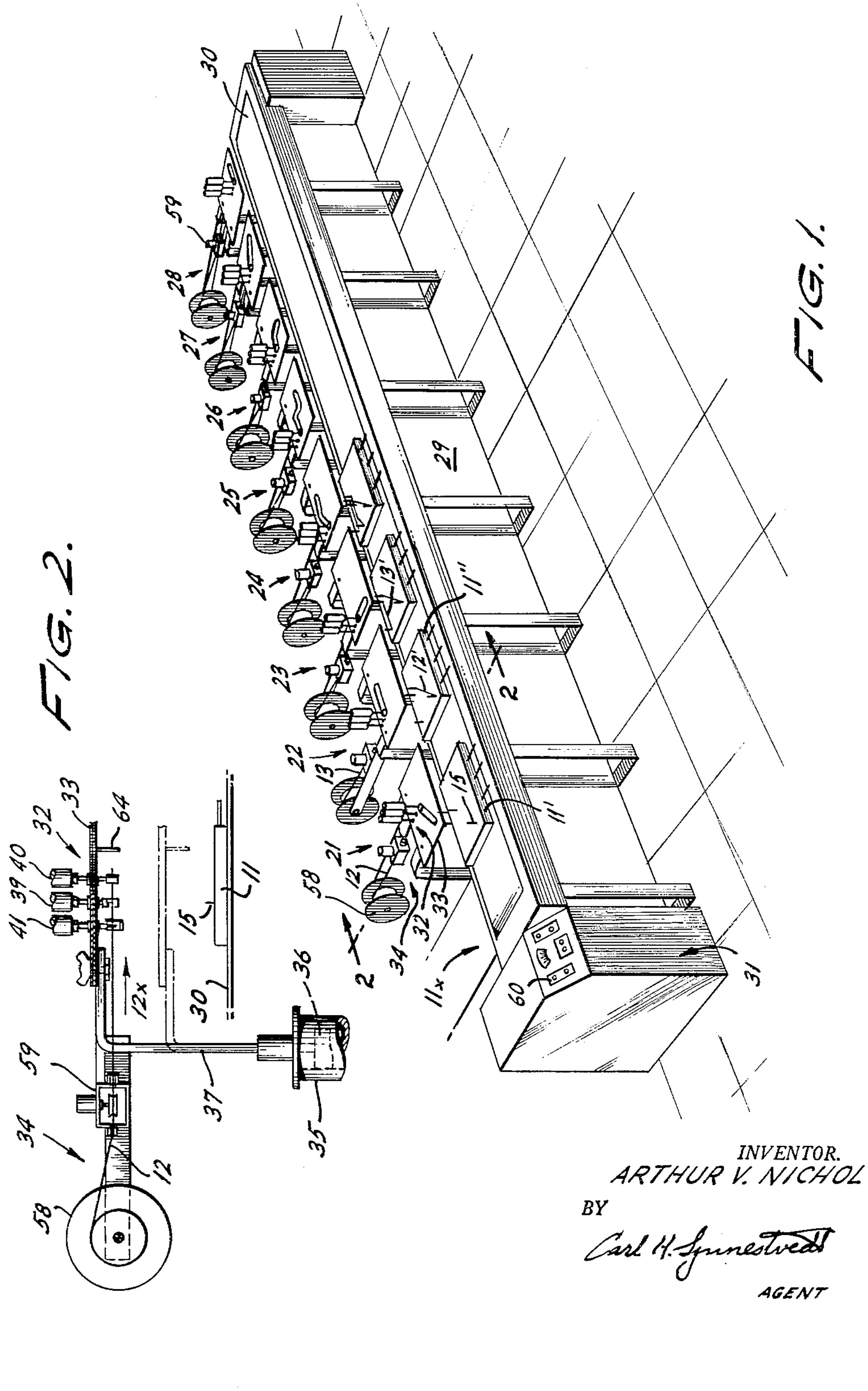
FIGURE 1 is a perspective view of a machine constructed in accordance with this invention.
FIGURE 2 is a fragmentary section taken along line 2—2 in FIGURE 1.

Referring now to FIGURE 1, there is shown a wire dressing and connecting machine, constructed in accordance with this invention, for wiring receiver chassis 11, 11', etc. with conventional, insulated wires 12', 13', etc. The machine comprises a series of wire dressing and connecting heads 21, 22, 23, 24, 25, 26, 27, 28, mounted on a base 29 shown as an elongated structure. A conveyor or transfer structure 30 extends along this base and series of heads, for carrying a continuous stream of chassis structures 11, 11', 11'', etc. to and through the fabricating zones provided by the heads. A power and control unit 31 is associated with the conveyor, providing suitable means—not shown in detail—for intermittently, horizontally moving the conveyor with the series of chassis 11, etc., until each chassis has arrived in a fabricating zone 21, etc. The transfer and control means 30, 31 may orient each chassis 11, etc. within and relative to the respective fabricating zone 21, etc., after each transfer movement, and may perform other controlling and supervisory functions of the required programming for instance in the manner disclosed in the copending applcation of John G. Lord and Charles W. Woods, Serial No. 559,-335, filed on January 16, 1956, now Patent No. 2,908,010 and assigned to the assignee of the present invention.

Each wire dressing and connecting head 21, etc. comprises, as principal parts thereof, a wire dressing and connecting tool unit 32; a tool guide structure, shown as a slotted board or template 33; and a wire feeding structure, generally identified by the numeral 34.

As shown in FIGURE 2, the tool units 32, tool guides 33 and feeding structures 34 of the heads 21, etc. are adapted by hydraulic or pneumatic cylinder and piston means 35, 36, to effect relative motion between the head and any chassis held below the head. This relative motion is transverse of the transfer path 30. It is shown, more particularly, as a one-step vertical motion, applied to each individual head and transmitted from the piston means 36 to the tool devices by a holder structure 37.

Figure 3:
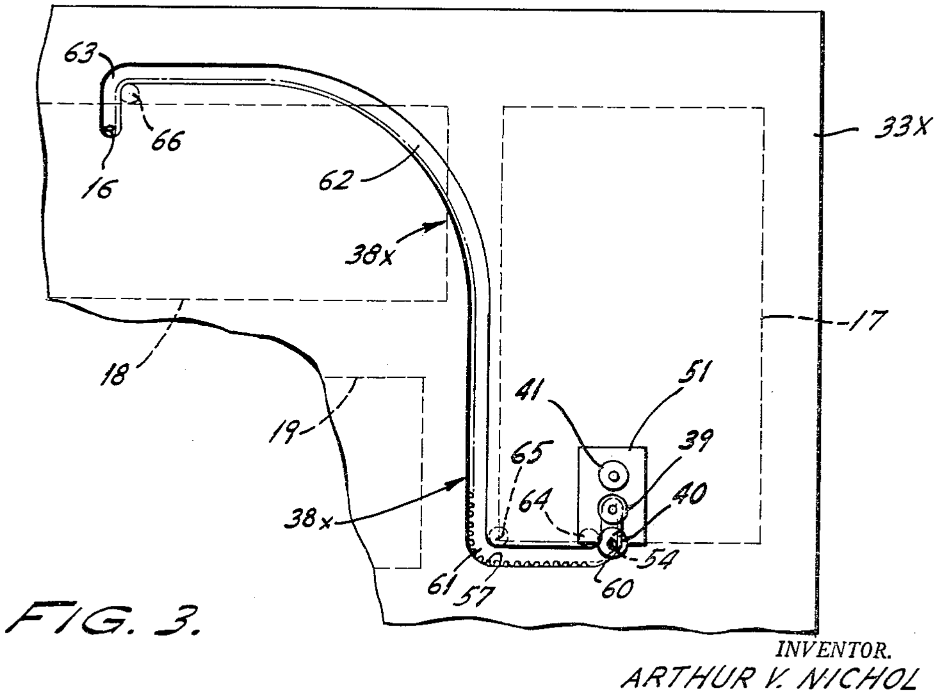
FIGURE 3 is a fragmentary plan view of a tool guide element, shown in sectional elevation in FIGURE 2.

A simple tool-guiding template 33 is shown in FIGURE 3. It overlies and covers one of the chassis 11, 11', etc. and the panels 17, 18, 19, etc. thereof, when the chassis has been moved into the corresponding wiring head; and it is then accurately registered with the chassis. Usually each wire 12, 13, 14, etc., to be installed on each chassis, is most conveniently installed by means of an individual tool guide board 33, with one particular guide slot 38 therein, although it is possible to incorporate several such slots in one board, mainly if the clots do not cross one another. FIGURE 3 shows, with greater particularity, a guide plate 33*x* having a guide slot 38*x* with several bends or corners therein, for suitable dressing and connecting operations to be performed on the specific wire 12, shown in FIGURE 10. In all other respects the different guide boards 33 of the machine may be identical. They may also be quite simple. As best shown in FIGURE 2 they may be attached to the holders 37 by fastening means such as wing bolts.

Figures 4, 5, 6:
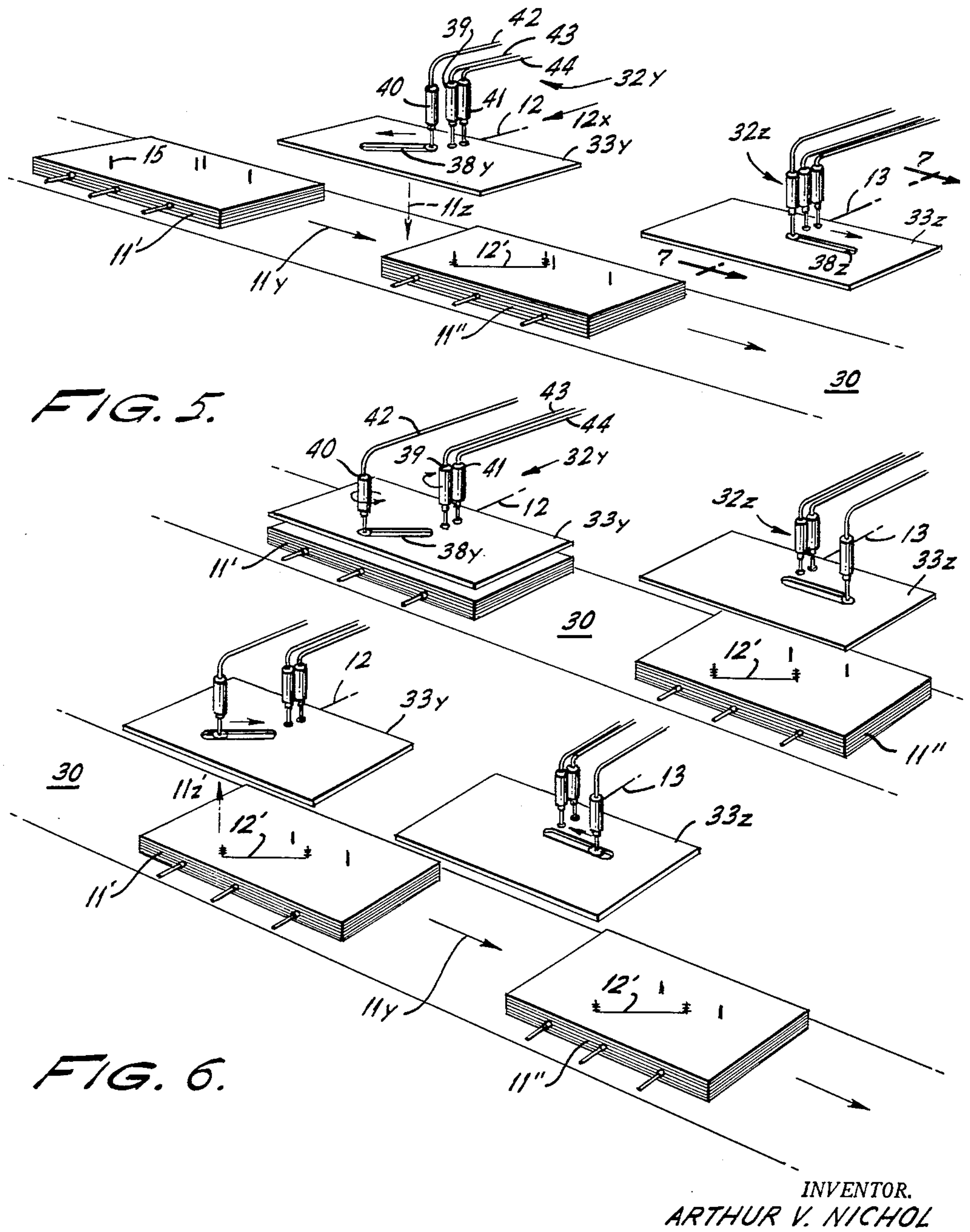
FIGURES 4, 5 and 6 are perspective, diagrammatic views of two wiring stations forming part of the machine of FIGURE 1, under three different operative conditions.

A pair of guide boards 33*y*, 33*z* is schematically shown in FIGURE 4, each having a guide slot 38*y*, 38*z*. As shown in this figure, each guide slot is associated with a tool unit 32*y*, 32*z*, comprising a stationary wire connecting tool 39, a movable wire connecting tool 40 and a stationary wire cutting tool 41. Each tool unit is provided with a wire 12 or 13, etc., by the corresponding feeder unit 34, which as shown in FIGURE 2, may operate below the guide board 33; and the tools may be supplied with power, for instance electric or pneumatic power, by suitable conduits 42, 43, 44, above the boards 33*y*, etc., as shown in FIGURE 4.

As indicated in FIGURES 5 and 6 and as will be described in greater detail hereinafter, the movable tools 40 are adapted to move along their respective guide slots 38*y*, etc. and thereby to cooperate with other required movements of different parts of the mechanism in the dressing and connecting of the wires 12, 13, etc.

Figure 7:
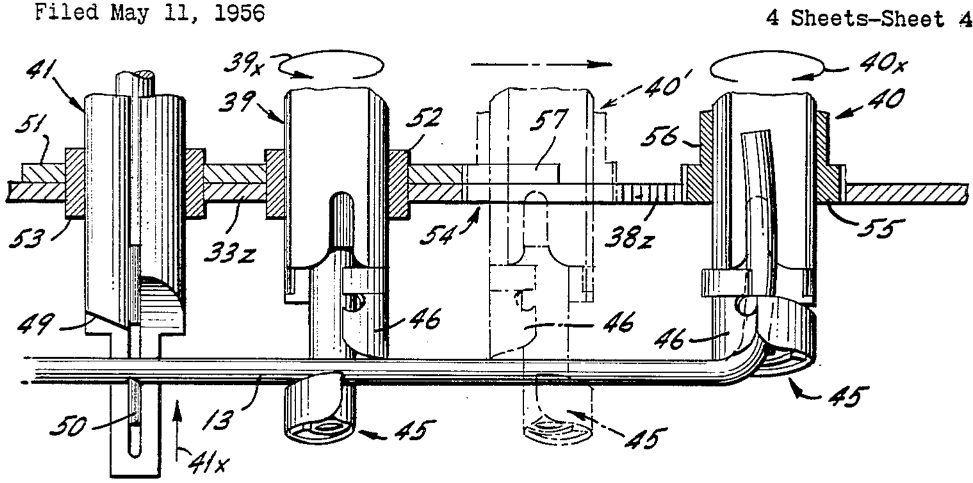
FIGURE 7 is a fragmentary detail view, on an enlarged scale, taken along line 7—7 in FIGURE 4.

With respect to these parts, in their present embodiment, reference may next be made to FIGURE 7, wherein the tools 39, 40, 41 of one of the stations are shown in the position of FIGURE 5; the movable tool 40 being also shown in its initial position 40', close to the other tools 39, 41, in broken lines. The tools 39, 40 are specifically shown as pressure wrapping tools, although in accordance with broader aspects of this invention, other connecting tools can also be used.

Figures 8, 9:
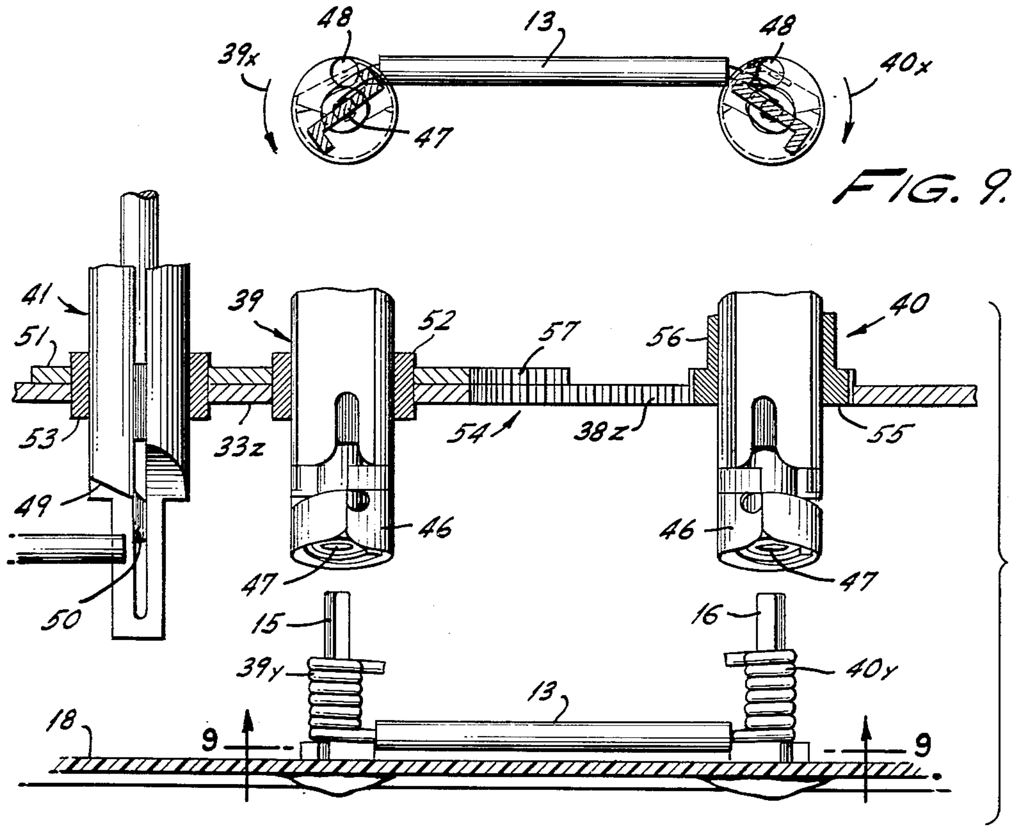

Each wrapping tool 39, 40, has, below the guide board 33*z*, a wire engaging tool head and spindle 45, adapted to engage the wire 13 supplied thereto, to grip it and, after suitable registration with the terminals on the chassis, to strip the ends of the wire of insulation and to wrap them onto terminal prongs 15, 16, etc. upstanding from the chassis 11', 11'', etc.; see FIGURE 8. For these purposes each wire-engaging head 45 cooperates with a gripping sleeve 46, the parts 45, 46 being adapted to be moved relative to one another, by power supplied through the conduit 42 (FIGURES 4, 5 and 6) and with the aid of intermediate devices not shown herein. It may be noted that the parts 45, 46 are shown in open and wire-receiving position at 39 and 40' in FIGURE 7 and in closed or wire-grippng position at 40 in FIGURE 7 and both at 39 and 40 in FIGURE 8. The manner in which these tools engage the wire 13 will be understood most readily by also considering FIGURE 9. Here it will also be seen that each tool 39, 40 has a downwardly facing central recess 47, adapted to engage one of the terminal prongs 15, 16, and an eccentric recess 48, adapted to engage, bend, wrap and strip one end of the wire 13.

The cutting tools 41 are equipped with cutting members 49 and 50 vertically movable relative to one another, by a mechanism not shown, under the effect of power supplied through a conduit 44 (FIGURES 4 and 5).

The stationary tools 39 and 41 may be rigidly mounted in a small holder plate 51, best shown in FIGURES 3 and 7, by means of suitable sleeves 52, 53; and each holder plate 51 may be secured to one of the tool guide plates 33*x*, 33*y*, 33*z*, etc. by suitable fastening means. The movable tools 40, on the other hand, are adapted either to be held in end portions 54 of the holders 51 or to make excursions therefrom along the slots 38*z*, 38*x* of the guide plates. Power, received through a conduit 42, may rotate a pinion 55 mounted on a sleeve 56 surrounding each movable tool 40. Each pinion 55 is shown as being in mesh with rack means 57, formed along one of the edges of a guide slot 38*x*, 38*z*, etc. For this purpose it is possible for instance to engage suitably connected side roller means, not shown, with the opposite, smooth side of the rack, and to hold the tool, sleeve and pinion against gravity by still other roller means, not shown.

The basic structure as well as the method of the invention will be understood most clearly upon a study of the operating program, which is as follows.

Initially, the conveyor 30 (FIGURE 1) is loaded with the first of a series of chassis 11 by chassis feeding means, not shown, which may deliver the chassis along a path 11*x* transverse of the transfer path 30. Arrangements are made to have in each wiring head 21, etc., a guide plate 33, etc. with a guide slot 38, etc. suitably chosen for desired dressing and connecting of the wire 12, etc.; and provision is also made to have in each wiring head 21, etc. a suitable supply of such wire 12, etc., properly color coded, which may be held for instance on a reel 58 (FIGURE 2) and may be supplied to the tools 39, 40, 41 by a suitable wire feeding and straightening mechanism 59. In the starting position all movable tools 40, forming part of the tool units 32, are positioned adjacent the corresponding stationary tools 39, 41, as shown in FIGURE 1, and a straight-line arrangement is maintained between the wire feeder 59, cutting tool 41, stationary wrapping tool 39 and movable wrapping tool 40 of each head. The pistons 36 holds the tool and guide holders 37 raised above the conveyor 30, as shown in FIGURES 1, 2 and 4.

In order to start actual operation, the operator closes a switch 60 in the control unit 31 (FIGURE 1), thereby actuating suitable power circuits, not shown, whereby the conveyor 30 and the associated supervisory mechanism, not shown, are set in motion, initiating a procession of chassis 11', 11'', etc. from the feed station 11x into and along the transfer path 30 and into the successive wiring heads 21, etc. FIGURE 1 shows the machine shortly after the beginning of this operation, when four chassis have been received, which have been brought respectively to stations 21, 22, 23, 24. As hereinbefore mentioned, the chassis are registered relative to these stations by devices such as those shown in detail in the Lord-Woods application.

Whenever one or several chassis have been or are being conveyed and registered in this manner, the control unit 31, by the circuit means thereof, not shown, initiates a wiring program cycle, desirably with individual control for selective operation or non-operation of each of the wiring heads, which may or may not have received a chassis to be wired. Such wiring programs, of course, could also be initiated manually, but it will be understood that a full-automatic operation (for instance as described in the Lord-Woods application) is greatly preferred. Desirably (and in this respect distinguishing from the ordinary operation of the machine described in the Lord-Woods application), wiring and transferring program cycles may largely overlap in certain forms of the present method and machine, although it is also possible, and preferable in other applications of this invention, to provide strict alternation of wiring and transferring cycles.

The different, early phases of a wiring cycle are best explained in connection with FIGURE 4. They start with simultaneous feed strokes of wires 12, 13, etc. in directions 12x, by means of the wire feeders 59 (FIGURE 2). Each feed stroke causes a horizontal movement of the front end of the wire, previously cut in manner to be described hereinafter; and by such movement said front end of the wire is pushed through a sufficient distance to insert the front end into, and move it a predetermined distance through, the wire-engaging members 45, 46, of the movable tool 40; the wire being held adjacent these members and the corresponding members of the stationary tools 39, 41 by suitable guide means, not shown. This feeding, effected by the feeder 59, can be the same in each cycle and can also be the same in each wiring head 21, 22, etc. of the preferred machine shown herein. Accordingly, this beginning phase of the wiring operation can be controlled by well-known, simple timing or measuring devices, not shown. Thus it is possible to simultaneously load for instance wiring head 21 with a given length of black wire 12, wiring head 22 with an identical length of white wire 13, wiring head 23 with an identical length of red wire 14, etc.; and in the meantime all or part of the transferring of chassis 11, 11', etc. can be performed. At the end of this phase the movable tools 40 engage their respective wires by operation of their gripping jaws 45, 46 (FIGURE 7).

So far as the wire feeding operation has been described up to now, each wire was moved across the stationary tools 41, 39, into the movable tool 40, by a pushing operation of the feeder 59. In the next phase of the wiring cycle, which may still coincide with a chassis transfer or registering movement, each wire is pulled across the stationary tools 41, 39 and is simultaneously unwound further from the reel 58, by the excursion of the movable tool 40, which is caused by the pinion 55 (FIGURE 7). During this new phase the wire feeder 59 merely idles. The start of the pulling operation can be simultaneous in the different heads 21, 22, etc. (FIGURE 1), whereas the end of the operation generally occurs at different times, depending on the effective lengths of the different slots 38 (FIGURES 3, 4).

The slot 38 defining the path of the wire shaping and dressing motion may have various sharp corners 60, 61 turning in clockwise directions, long-radius bends or curves 62 either simple or complex and other corners 63 turning in counterclockwise directions. Whenever a sharp corner occurs, the wire is desirably bent about a dressing finger 64, 65 or 66 installed on and depending from the plate 33 on the inside of such bend or corner (also see FIGURE 2); or alternatively corner posts or the like can here be provided on the chassis 11 itself. The latter expedient is preferable mainly where wires are used which are too flexible to maintain a form once given to them; and in this case, one of the last fabricating stations, such as station 28 in FIGURE 1, may be adapted to bend or clinch these posts down over the wires, to hold the wires permanently in place. On the other hand, fairly stiff wires may retain bent forms given to them, either with long radius as at 67 (FIGURE 10) or with relatively sharp-cornered effect as at 68, 69 and 70.

When the movable tools 40 of all wiring stations, with their differently color-coded wires, have arrived or are arriving at the ends of their guide slots 38, there is normally performed a downward motion of the guide plate and tool unit 32, 33 (FIGURES 2 and 4), toward the underlying chassis 11', in a direction 11z, thereby establishing the position shown in FIGURE 5 at the left. Exceptionally, for instance if wire 13 has run out on one of the supply drums or if one of the chassis 11'' has been misaligned on the conveyor 30, arrangements can be made—for instance in the manner described in the Lord-Woods application—to leave the corresponding tool plate 33z and tool unit 32z raised and inoperative and to take other remedial action, as suggested in FIGURE 5 at right. Otherwise, all tool and guide units 32, 33 may move downwardly together, thereby substantially completing the insertion-preparing phases of the cycle. However, it is still necessary, if and when a tool and guide unit 32, 33 is lowered onto and engaged with the underlying chassis, to continue the wiring cycle by operation of the stationary wrapper tool 39 (FIGURE 7) to grip the wire between jaws 45, 46, and by operation of the cutting tool 41 to perform a cutting stroke, for instance in direction 41x. These operations may follow one another in the sequence as stated, or may occur simultaneously or in the opposite sequence.

This, finally, enables the wrapping tools 39 and 40 to perform their principal or wrapping operations; and these operations follow as the next major phase of the wiring cycle. This is suggested by curved arrows in FIGURE 5 at left and is similarly suggested in FIGURE 7. The two cooperating wiring tools 39, 40 of each wiring head 21, 22, etc. (FIGURE 1) rotate, for instance simultaneously, in directions 39x, 40x (FIGURE 9) which are desirably opposite to one another in each head. By so doing, they not only serve to produce suitably pressure-wrapped coils 39y, 40y on the registered terminal prongs 15, 16 (FIGURE 8), but also to tension the previously positioned wires around the various dressing fingers 64, 65, etc. (FIGURE 3).

The next operation of the wiring cycle consists in raising the previously lowered tool and guide plate units 32, 33, with dressing fingers 64, 65, etc., in directions 11z' (FIGURE 6) while the connected wires now are retained on the chassis, by means of their pressure connection with terminals 15, 16, etc.; and, if necessary, the insulated wires bent around the dressing fingers 64, etc., may be positively stripped from these fingers, as the fingers retract relative to the chassis. This may be done by added tools, not shown.

This operation or the start thereof is followed by simultaneously starting reverse rotation of pinions 55 (FIGURE 7) or operation of other suitable means for effecting return movements of all movable tools 40 along their guide slots 38, and by more or less simultaneously starting transfer movements 11y, promoting each chassis to the next wiring head and reestablishing the original positions with newly arriving chassis (FIGURE 4).

A resume of one operating cycle, as described, is as follows, with the understanding that time is shown on the horizontal axis of the chart which follows:

<table>
<tr><th>TOOL</th><th colspan="9">OPERATION</th></tr>
<tr><td>Conveyor & Control 30, 31</td><td colspan="6">Moving</td><td colspan="3">------------</td></tr>
<tr><td>Lifting Pistons 36</td><td colspan="4">Descending</td><td colspan="3">------------</td><td colspan="2">Rising</td></tr>
<tr><td>Wire Feeders 59</td><td>Pushing</td><td>------------</td><td>Idling</td><td colspan="4">------------</td><td>------------</td><td>------------</td></tr>
<tr><td>Wire Pullers 40</td><td>------------</td><td>Gripping</td><td>Pulling</td><td>------------</td><td colspan="3">Wrapping</td><td>------------</td><td>Returning</td></tr>
<tr><td>Wire Wrappers 39</td><td>------------</td><td>------------</td><td>------------</td><td colspan="2">Gripping</td><td colspan="2">Wrapping</td><td>------------</td><td>------------</td></tr>
<tr><td>Wire Cutters 41</td><td>------------</td><td>------------</td><td>------------</td><td colspan="4">Cutting</td><td>------------</td><td>------------</td></tr>
</table>

It will be seen that the principal operations of the main tools 39 and 40 ("wrapping") are preceded by auxiliary operations, performed in several steps by auxiliary tools 59 and 41, in two steps by lifting device 36, and in basically one step by conveyor and control device 30, 31. The principal operations are preceded and followed by auxiliary operations ("pulling" and "returning") of one of the main tools, 40. It will also be seen that several operations may overlap, as more fully described above.

Chassis can be wired by the new system with much greater speed and efficiency than was available by previous methods, either manual or automatic.

Particularly, panel design is greatly facilitated. The limited space available on a chassis, for the positioning of terminals and wires, is most completely utilized by means of the guide slots 38, the ends of which can be registered with any desired positions and the intermediate portions of which can be designed so as to avoid interference with any adjacent terminals or other components. Heretofore, a so-called modular spacing of terminals was required in order to avoid such interference, with the result that the earlier machines provided only about sixteen to twenty-five terminal positions per square inch of panel board. No such limitation exists in the present machine.

Yet, the mechanism of the present machine is much simpler than that of the mechanized devices heretofore used or proposed for chassis wiring. Even when such earlier devices operated with a single set of wiring tools, slowly and laboriously making successive straight-lined wire connections with the use of wire of one single color, gauge and general type, the earlier machines required complex instrumentation for recording and subsequently utilizing digital or similar program commands. All of this is absent in the present machine, which nevertheless is much more versatile as well as much faster.

Moreover, the changes of wiring arrangements which are often required are greatly facilitated. If and when it becomes necessary to modify, for instance, one or two of the numerous non-adherent wires used in a receiver chassis, the present system requires only replacement of one or two guide boards 33, which can be effected without creating any confusion in the associated tool units 32, the control system 31 and the other cooperating parts. By contrast, when such a change was previously made in a fabricating system employing manual labor for present purposes, extensive retraining was necessary and the probability of error was still great; and when such a change was made in one of the automatic machines heretofore developed for present purposes, a complete programming record, for all of the elements, had to be newly made, installed and broken in.

It will be understood that details of the present operation and particularly of the wiring cycle or sequence can be modified in many respects. For instance changes are possible as to the periods of overlap of operations of the lifting pistons 36 with operations of the conveyor and control and of the various tools; also as to the directions and heights of lifting. The last-mentioned features can be modified for instance in order to provide for wrapping connection of more than one wire on a single terminal post, as in the case of the connection of wire 14 at the right of curve 67 in FIGURE 10.

Likewise a number of modifications can be applied to the preferred tools shown, all within the scope of this invention. As mentioned before, the excursions and return movements of a movable tool may pass through a plurality of successive planes instead of the single plane shown herein. Simplification is possible in that some wires, such as those shown at 14 in FIGURE 10, may be connected only to a single terminal, in which event the tool unit 32, provided for such a wire, requires only a single movable gripping and wrapping tool 40 and a stationary cutter tool 41, no stationary wrapping tool. Some wires, such as that shown at left of terminal 16 in FIGURE 10, may be uninsulated, or may be entirely stripped of insulation by the present device, or may be installed by insertion means other than that described herein; and of course each of the various motions described can be performed by a variety of devices other than those specifically shown.

I claim:

In a method of connecting flexible wires to terminal lugs of a flat, electrical component-carrying circuit panel, the steps of: first performing concurrent panel and wire insertions, the panel insertion comprising transferring said panel in a rectilinear horizontal direction and into a flat wire attachment zone, and the wire insertion comprising guiding, transferring and bending an elongate portion of at least one of said wires, in a flat wire insertion area overlying said wire attachment zone and parallel thereto, by a plurality of successive, differently directed, horizontal motions of said portion, performed in the latter zone, transverse of said rectilinear horizontal direction, a substantial amount of such motion being performed prior to completion of the panel insertion and all of said motions being guided in such a way that on completion of the panel insertion the inserted wire portion is in registry with and superposed above spaces between the panel-carried components and that an end of the inserted wire portion is in registry with an underlying terminal lug of the inserted panel; thereupon connecting said end of the inserted wire portion with said underlying terminal lug; and thereafter performing further, generally similar transfers of the same panel and of new wires and further, generally similar connecting operations, in successive wire insertion and attachment zones.

References Cited in the file of this patent

UNITED STATES PATENTS

| | | |
|---|---|---|
| 1,564,843 | Fulton | Dec. 8, 1925 |
| 1,639,700 | Martin | Aug. 23, 1927 |
| 2,718,627 | Swenson | Sept. 20, 1955 |
| 2,756,485 | Abramson et al. | July 31, 1956 |
| 2,759,166 | Mallina | Aug. 14, 1956 |
| 2,762,113 | Daniels et al. | Sept. 11, 1956 |
| 2,772,416 | Dorosz et al. | Dec. 4, 1956 |
| 2,862,670 | Mallina | Dec. 2, 1958 |

FOREIGN PATENTS

| | | |
|---|---|---|
| 226,895 | Great Britain | Jan. 6, 1925 |